(12) United States Patent
Tsai et al.

(10) Patent No.: US 8,519,667 B2
(45) Date of Patent: Aug. 27, 2013

(54) MOBILE WIRELESS CHARGER SYSTEM

(75) Inventors: Ming-Chiu Tsai, New Taipei (TW); Chi-Che Chan, New Taipei (TW)

(73) Assignee: Fu Da Tong Technology Co., Ltd., New Taipei (TW)

( * ) Notice: Subject to any disclaimer, the term of this patent is extended or adjusted under 35 U.S.C. 154(b) by 330 days.

(21) Appl. No.: 13/067,127

(22) Filed: May 11, 2011

(65) Prior Publication Data

US 2012/0286724 A1    Nov. 15, 2012

(51) Int. Cl.
*H01M 10/46* (2006.01)
(52) U.S. Cl.
USPC .......................................... 320/108; 320/114
(58) Field of Classification Search
USPC .................. 320/101, 107, 108, 114, 115, 128
See application file for complete search history.

(56) References Cited

U.S. PATENT DOCUMENTS

| 2004/0196082 A1* | 10/2004 | Pacha et al. | 327/215 |
| 2006/0152085 A1* | 7/2006 | Flett et al. | 307/75 |
| 2011/0115442 A1* | 5/2011 | Garrastacho et al. | 320/157 |

* cited by examiner

*Primary Examiner* — Edward Tso
(74) *Attorney, Agent, or Firm* — Bacon & Thomas, PLLC

(57) ABSTRACT

A mobile wireless charger system includes a supplying-end module and a receiving-end module. The supplying-end module adjusts the output wave energy to the receiving-end module at a handheld apparatus by means of modulated frequency and driving power. The microprocessor of the supplying-end module can receive different voltage input from different power sources, such as high voltage city power supply or low voltage solar cell for charging a rechargeable battery at the handheld apparatus in a wireless manner.

12 Claims, 4 Drawing Sheets

MOBILE WIRELESS CHARGER SYSTEM

BACKGROUND OF THE INVENTION

1. Field of the Invention

The present invention relates to wireless electrical power supplying and charging technology and more particularly, to a mobile wireless charger system, which is capable of converting input power supply of different voltages into the desired power supply for a receiving-end module.

2. Description of the Related Art

Following fast development of electronic technology and polarization of internet application, many digitalized electronic products, such as digital camera, cellular telephone, multimedia players (MP3, MP4, MP5 players), audio and video handheld electronic devices and etc., have been continuously created and have appeared on the market. These modern digital electronic products commonly have light, thin, short and small characteristics.

For high mobility of a handheld electronic device (for example, cell phone), power supply is an important factor. A mobile digital electronic product generally uses a rechargeable battery to provide the necessary working voltage. When power low, the rechargeable battery can be recharged. For charging the rechargeable battery of a digital electronic product, a battery charger shall be used. However, different cell phone models have different battery specifications. Some models use detachable battery. Some others use a built-in battery that is not detachable. When charging the battery of a mobile electronic device, the user may need to electrically connect the mobile electronic device to a city power outlet with a charging cable, or to a computer with a USB power cable. When in a place where no any city power outlet or computer USB port is available, charging of mobile electronic device is not workable. When preparing a spare battery or energy collector means for outdoor application, the cost will be high. Further, an attached battery has a certain dimension. When an attached battery is installed in a cell phone, the size of the cell phone becomes large. Further, when charging a cell phone, it will be inconvenient to hold and operate the cell phone. Further, a regular energy collector has a big size and is not attachable to a cell phone. When using a cell phone with an energy collector, a connection cable must be used and connected between the cell phone and the energy collector. When carrying a cell phone and going outdoors, it will be inconvenient to carry an extra attached battery and or an energy collector with the related cable.

Further, an electromagnetic induction type power transmission system may be used for charging a handheld electronic apparatus wirelessly. However, conventional wireless induction type power supply systems are still not satisfactory in function and have many drawbacks, such as: when using a wireless induction type power supply system, it is necessary to keep the transmitter coil and the receiver coil in accurate alignment; supplying energy is not adjustable subject the distance between the transmitter coil and the receiver coil or the condition of the load; low transmission efficiency; the operation of a DC-DC Step-Down IC to step down the voltage of the power received by the receiver coil must be completely with the switching action of a switch, and energy loss, interference noises and thermal energy will occur during the switching action.

Therefore, conventional wireless induction type power supply systems do not allow input of different voltages (low voltage solar power, high voltage city power), and can only accept a specific voltage power source, limiting the application.

Therefore, an improvement in this regard is necessary.

SUMMARY OF THE INVENTION

The present invention has been accomplished under the circumstances in view. It is one object of the present invention to provide a mobile wireless charger system, which comprises a supplying-end module and a receiving-end module, wherein the supplying-end module adjusts the output wave energy to the receiving-end module at a handheld apparatus by means of modulated frequency and driving power; the microprocessor of the supplying-end module can receive different voltage input from different power sources, such as high voltage city power supply or low voltage solar cell for charging a rechargeable battery at the handheld apparatus in a wireless manner.

It is one object of the present invention to provide a mobile wireless charger system, which comprises a supplying-end module and a receiving-end module, wherein the supplying-end microprocessor of the supplying-end module controls transmission of power supply to the receiving-end module efficiently and safely in a wireless manner subject to running of built-in software, and can output a PWM (pulse-wave modulation) signal to a first driver circuit and a second driver circuit to check the power output of a supplying-end resonant circuit subject to the performance of the built-in software, and therefore the supplying-end microprocessor can automatically adjust the power output of the supplying-end resonant circuit subject to the need of the receiving-end module. Further, the supplying-end microprocessor automatically controls a voltage sensing circuit and a temperature sensor module to monitor the voltage and temperature at multiple points during operation of the system.

DETAILED DESCRIPTION OF THE PREFERRED EMBODIMENT

Figure 1:
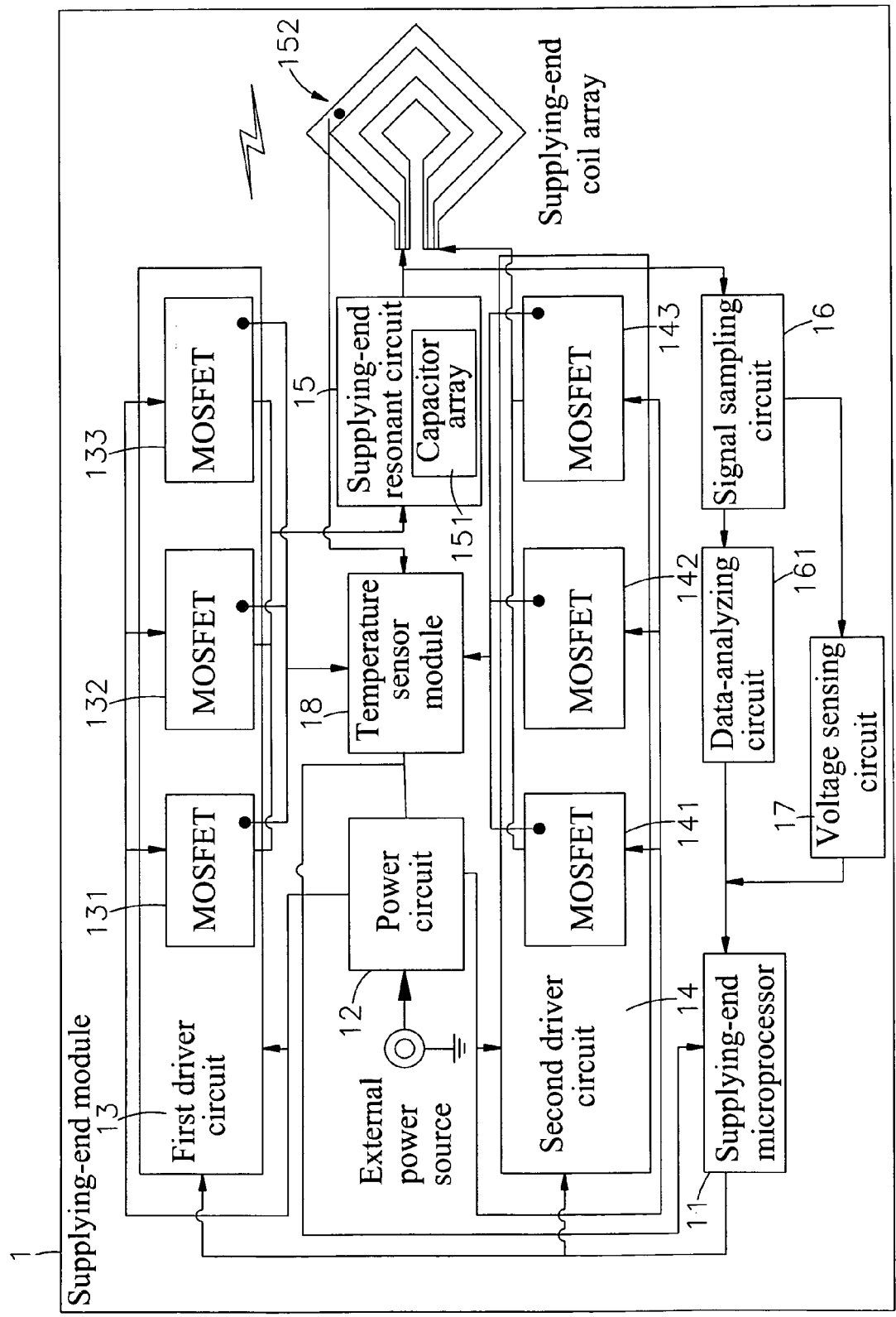
FIG. 1 is a circuit block diagram of a supplying-end module for mobile wireless charger system in accordance with the present invention.
Figure 2:
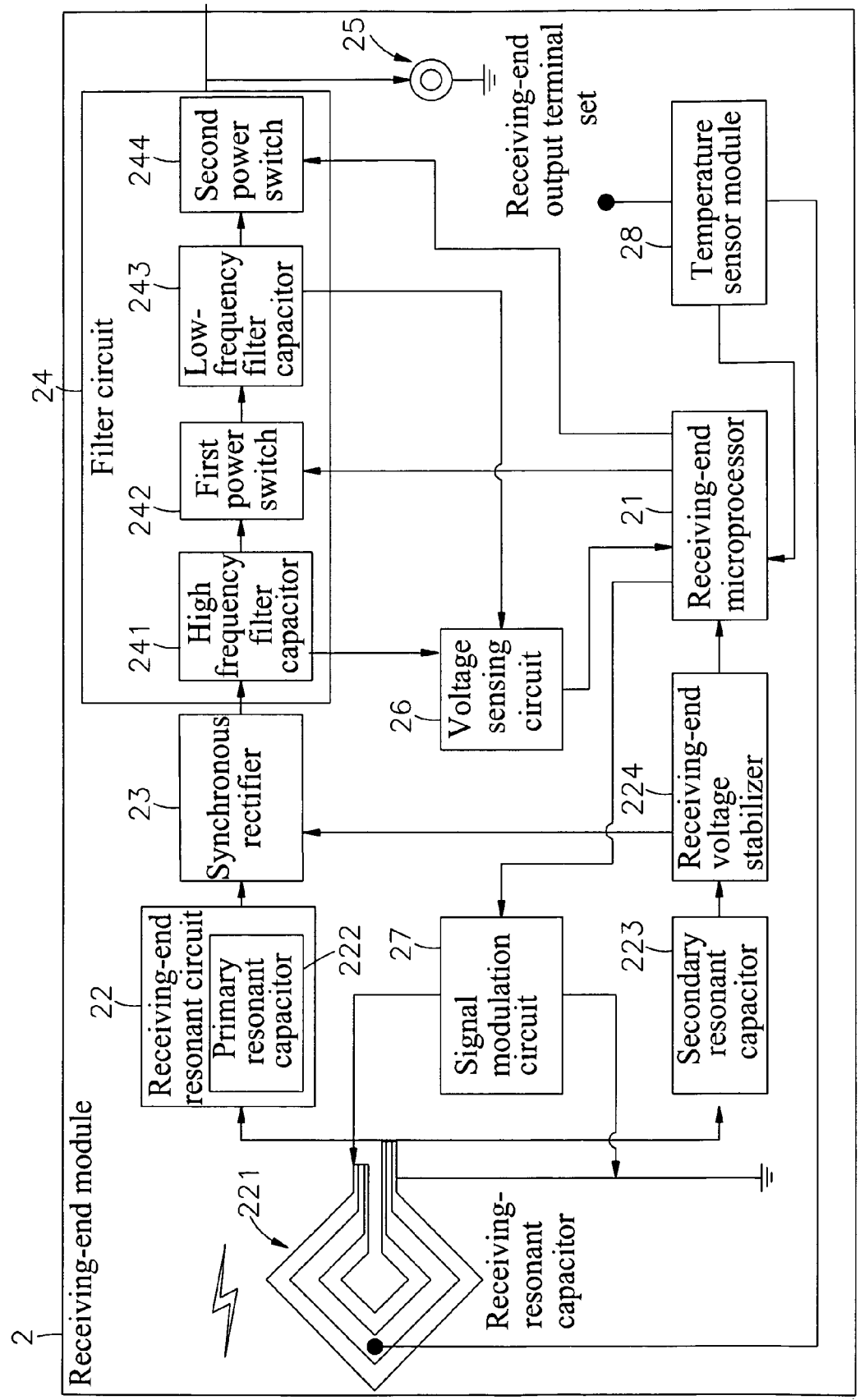
FIG. 2 is a circuit block diagram of a receiving-end module for mobile wireless charger system in accordance with the present invention.

Referring to FIGS. 1 and 2, a mobile wireless charger system in accordance with the present invention is shown comprising a supplying-end module 1 and a receiving-end module 2.

The supplying-end module 1 comprises a supplying-end microprocessor 11 having set therein operation and control-related software and a memory, a power supply circuit 12, a first driver circuit 13, a second driver circuit 14, a supplying-end resonant circuit 15, a signal sampling circuit 16, a data-analyzing circuit 161, a voltage sensing circuit 17 and a temperature sensor module 18. The first driver circuit 13 and the second driver circuit 14 are electrically coupled to the supplying-end microprocessor 11 in a parallel manner relative to the power circuit 12. The first driver circuit 13 comprises a plurality of MOSFET (metal oxide semiconductor field effect transistor) arrays 131;132;133 connected in parallel. The second driver circuit 14 comprises a plurality of MOSFET (metal oxide semiconductor field effect transistor) arrays 141;142;143 connected in parallel. The supplying-end resonant circuit 15 comprises a capacitor array 151 electrically connected to the first driver circuit 13, and a supplying-end coil array 152 electrically connected to the second driver circuit 14 to obtain the necessary working energy. The signal sampling circuit 16 is electrically coupled with the supplying-end coil array 152. The data-analyzing circuit 161 and the voltage sensing circuit 17 are electrically connected in parallel between the supplying-end microprocessor 11 and the signal sampling circuit 16. The temperature sensor module 18 is electrically coupled with the supplying-end microprocessor 11 and adapted for sensing the working temperature of the first driver circuit 13, the second driver circuit 14 and the supplying-end coil array 152.

The receiving-end module 2 comprises a receiving-end microprocessor 21 having set therein operation and control-related software and a memory, a receiving-end resonant circuit 22, which is electrically coupled with the receiving-end microprocessor 21 and, which comprises a receiving-end coil array 221, a primary resonant capacitor 222 electrically coupled with the receiving-end coil array 221 in a parallel manner, a secondary resonant capacitor 223 electrically coupled with the receiving-end coil array 221 in a parallel manner relative to the primary resonant capacitor 22 and a receiving-end voltage stabilizer 224 electrically coupled with the secondary resonant capacitor 223, a synchronous rectifier 23 electrically coupled with the primary resonant capacitor 222 and adapted for providing low voltage power to the receiving-end microprocessor 21 and the synchronous rectifier 23, a filter circuit 24, which is electrically coupled with the synchronous rectifier 23 and, which comprises a high-frequency filter capacitor 241, a first power switch 242 for controlling power output of the high-frequency filter capacitor 241, a low-frequency filter capacitor 243 and a second power switch 244 for controlling power output of the low-frequency filter capacitor 243, a receiving-end output terminal set 25 electrically coupled with the second power switch 244 for enabling the high-frequency filter capacitor 241 or the low-frequency filter capacitor 243 to output DC power supply to an external electronic device, a voltage sensor circuit 26 electrically coupled with the high-frequency filter capacitor 241 and the low-frequency filter capacitor 243 and adapted for sensing the voltage of the high-frequency filter capacitor 241 and the voltage of the low-frequency filter capacitor 243 and providing the detected signals to the receiving-end microprocessor 21 for enabling the receiving-end microprocessor 21 to control on/off of the first power switch 242 and the second power switch 244 subject to the detected signals, a signal modulation circuit 27 electrically coupled with the receiving-end microprocessor 21 and adapted for receiving a coding signal from the receiving-end microprocessor 21 to transmit a data signal to the supplying-end module 1 through the receiving-end coil array 221 for determining the power output value, and a temperature sensor module 28 electrically coupled with the receiving-end microprocessor 21 and adapted for sensing the working temperature of the receiving-end coil array 221 and the filter circuit 24.

Figure 3:
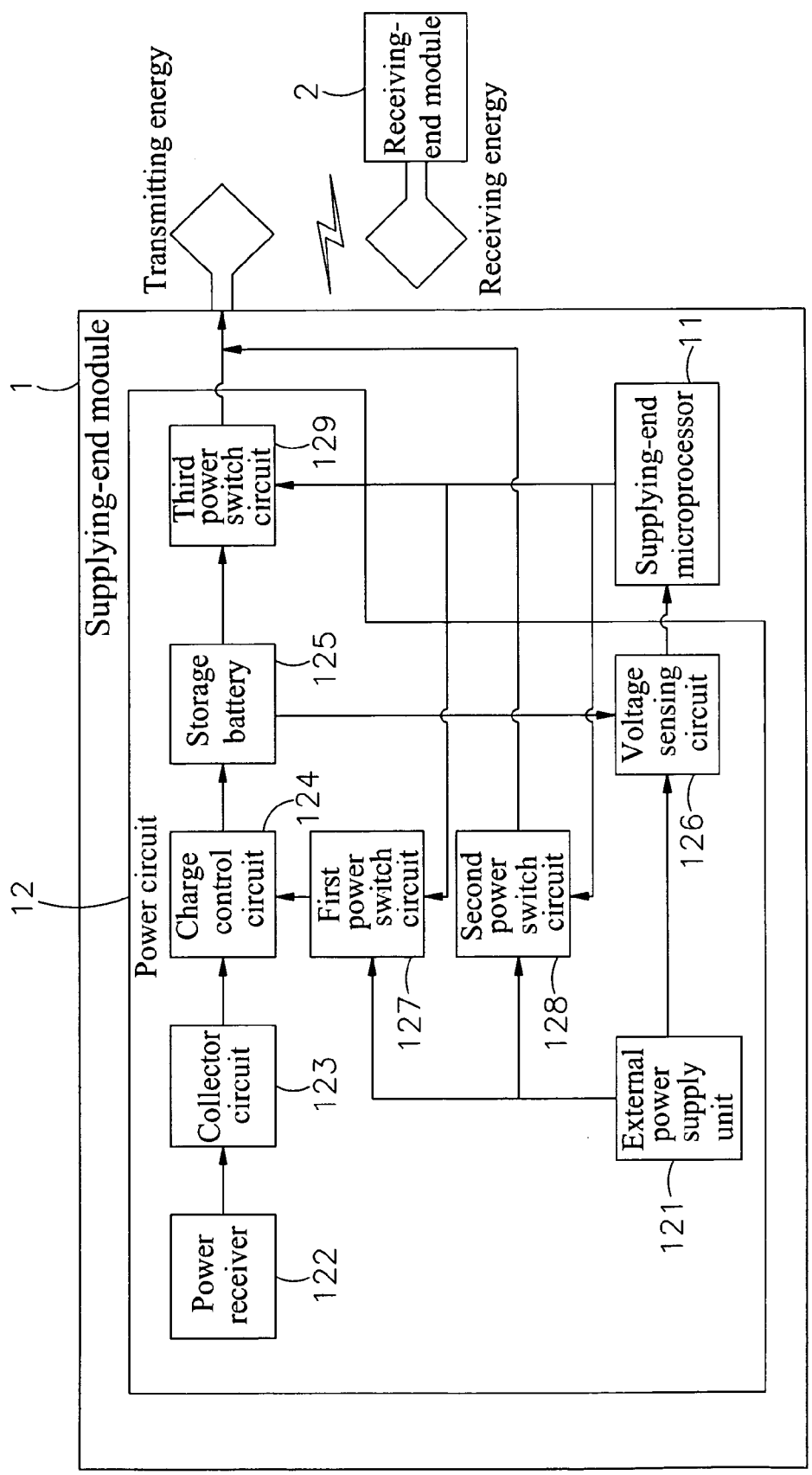
FIG. 3 is a circuit diagram of the power supply circuit of the supplying-end module for mobile wireless charger system in accordance with the present invention.

Referring to FIG. 3, the power supply circuit 12 of the supplying-end module 1 comprises an external power supply unit 121 for input of different voltages, a power receiver 122 for receiving external power supply, a collector circuit 123 electrically coupled with the power receiver 122, a charge control circuit 124, a storage battery 125, a voltage-sensing circuit 126, a first power switch circuit 127, a second power switch circuit 128 and a third power switch circuit 129. The collector circuit 123 collects electric energy for storing in the storage battery 125 subject to the control of the charge control circuit 124, and prohibits the power receiver 122 from over-charge damage, over-discharge damage or thrust damages. The voltage-sensing circuit 126 is electrically coupled with the supplying-end microprocessor 11 and adapted for sensing the voltage at the external power supply unit 121 and the storage battery 125 for determination of the operation mode. The first power switch circuit 127, the second power switch circuit 128 and the third power switch circuit 129 are electrically coupled with the supplying-end microprocessor 11 in a parallel manner. The first power switch circuit 127 is adapted for receiving power supply from the external power supply unit 121 and transmitting received power supply to the charge control circuit 124. The second power switch circuit 128 is adapted for receiving power supply from the external power supply unit 121 and transmitting received power supply to the supplying-end module 1. The third power switch circuit 129 is adapted for receiving power supply from the storage battery 125 and transmitting received power supply to the supplying-end module 1. By means of switching the first power switch circuit 127, the second power switch circuit 128 and the third power switch circuit 129, the supplying-end microprocessor 11 achieves power supply arrangement.

When the mobile wireless charger system is started up, the supplying-end microprocessor 11 of the supplying-end module 1 runs its built-in software to read in the default parameters from the memory thereof and then to scan the resonant points of the coils. The supplying-end microprocessor 11 scans, in a frequency-modulated manner, the maximum resonant frequencies F0 of the supplying-end coil array 152 and capacitor array 151 of the supplying-end resonant circuit 15, system predetermined minimum resonant frequency F1, system normal operating resonant frequency F2, system maximum operating resonant frequency F3 and the maximum resonant frequency F4 for output by the supplying-end microprocessor 11, and stores scanned resonant frequency data in the memory thereof. After the supplying-end microprocessor 11 stores the related resonant frequency data in the memory thereof, it enters the standby mode. At this time, the supplying-end microprocessor 11 outputs no PWM signal to the first driver circuit 13 and the second driver circuit 14, and therefore the supplying-end resonant circuit 15 does not transmit any electromagnetic energy. At the same time, the supplying-end microprocessor 11 starts to count a clock cycle. When the clock cycle is up, the supplying-end microprocessor 11 outputs a transient PWM signal to the first driver circuit 13/the second driver circuit 14, driving the supplying-end resonant circuit 15 to transmit electromagnetic energy for obtaining a data signal. At this time, the signal sampling circuit 16 scans feedback data signal from the receiving-end module 2 via the supplying-end coil array 152. When a feedback data signal is obtained from the receiving-end module 2, the supplying-end module 1 enters a power-supplying mode. At this time, the supplying-end microprocessor 11 outputs a continuous PWM signal to the first driver circuit 13 and the second driver circuit 14, driving the supplying-end resonant circuit 15 to transmit electromagnetic energy and to start supplying power supply to the receiving-end module 2. When no feedback data signal is obtained, the supplying-end module 1 returns to the standby mode. Further, in case of system abnormality or interruption of the power-supplying mode due to disconnection of the feedback data signal from the power-receiving module 2, the supplying-end module 1 will immediately return to the standby mode.

As stated above, the supplying-end module 1 can obtain power supply from an external power source through the external power supply unit 121. The external power supply unit 121 can be configured for the connection of a power input interface (USB connector, AC-to-DC transformer or city power plug) for input of power supply of different voltages. Further, the power receiver 122 can receive low power from an external power source (solar battery, kinetic energy cell or thermal energy cell) for storing in the storage battery 125. At the same time, the voltage-sensing circuit 126 senses the voltage status of the external power supply unit 121 and the storage battery 125 for enabling the supplying-end module 1 to control switching among four operation modes. In the first operation mode, high power (city power or AC-to-DC transformer) is inputted into the external power supply unit 121. At this time, the supplying-end module 1 switches on the first power switch circuit 127 and the second power switch circuit 128 and switches off the third power switch circuit 129, enabling inputted power to be directly used for transmitting to the receiving-end module 2 and also to be charged into the storage battery 125. In the second operation mode, low power (computer USB power) is inputted into the external power supply unit 121. At this time, the supplying-end module 1 switches on the second power switch circuit 128 and switches off the first power switch circuit 127 and the third power switch circuit 129, enabling inputted power to be used for transmitting to the receiving-end module 2 without charging the storage battery 125. In the third operation mode, no any external power is received. At this time, the supplying-end module 1 switches on the third power switch circuit 129 and switches off the first power switch circuit 127 and the second power switch circuit 128, enabling the storage power of the storage battery 125 to be used for transmitting to the receiving-end module 2. In the fourth operation mode, the voltage-sensing circuit 126 senses the storage battery 125 to be "low", at this time, the supplying-end module 1 switches off the first power switch circuit 127, the second power switch circuit 128 and the third power switch circuit 129, and the system will be started up again when an input of external power supply is sensed or when the storage battery 125 is charged to the level above the operating value.

Further, AC power supply inputted into the external power supply unit 121 is converted into DC power supply by the power circuit 12 so that the power circuit 12 provides stabilized low voltage power to the supplying-end microprocessor 11 and high voltage power to the first driver circuit 13 and the second driver circuit 14. As stated above, the first driver circuit 13 and the second driver circuit 14 each comprise a plurality of MOSFET (metal oxide semiconductor field effect transistor) arrays 131;132;133 and 141;142;143 connected in parallel. During a power-supplying operation, the supplying-end microprocessor 11 outputs a PWM signal to the first driver circuit 13/the second driver circuit 14 to switch the MOSFET (metal oxide semiconductor field effect transistor) arrays 131;132;133/141;142;143, thereby driving the capacitor array 151 and supplying-end coil array 152 of the supplying-end resonant circuit 15 to oscillate and to generate resonant wave energy for the receiving-end module 2. At this time, the signal sampling circuit 16 converts received analog signal into digital data signal for analysis by the data-analyzing circuit 161. At the same time, the voltage sensing circuit 17 detects the value of the output power of the supplying-end resonant circuit 15, and provides the detected result to the supplying-end microprocessor 11, enabling the supplying-end microprocessor 11 to determine whether or not to transmit power supply to the receiving-end module 2.

Further, by means of the temperature sensor module 18, the supplying-end microprocessor 11 can monitor the working temperature of the first driver circuit 13, the second driver circuit and the supplying-end coil array 152. If a temperature abnormality is detected, the supplying-end microprocessor 11 immediately switches off the first driver circuit 13 and the second driver circuit 14, or changes the configuration of the MOSFET (metal oxide semiconductor field effect transistor) arrays 131;132;133 and 141;142;143 to match the situation subject to the performance of the built-in software. Thus, subject to the performance of the built-in software to monitor system operating status and the voltage and temperature at multiple points on the real time, the supplying-end microprocessor 11 automatically controls adjustment of output power in accordance with the condition of the load.

When executing coil resonant point scan operation, the supplying-end microprocessor 11 reads in the maximum resonant frequency from the predetermined parameters stored in the memory thereof, and then outputs a PWM signal to the first driver circuit 13/the second driver circuit 14 to drive the supplying-end resonant circuit 15. At the same time, the supplying-end microprocessor 11 scans the coil signal amplitude of the supplying-end coil array 152 and capacitor array 151 of the supplying-end resonant circuit 15 in a frequency variable manner, and then compares the detected coil signal amplitude with the system parameter. If the comparison result shows that the coil signal amplitude is above the system parameter, the supplying-end microprocessor 11 raises the resonant frequency, enabling the coil signal amplitude to be moved toward the system maximum operating resonant frequency F3. Thereafter, the supplying-end microprocessor 11 outputs a PWM signal to the first driver circuit 13/the second driver circuit 14 to drive the supplying-end resonant circuit 15 again. If the comparison result shows that the coil signal amplitude is below the system parameter, the supplying-end microprocessor 11 lowers the resonant frequency, enabling the coil signal amplitude to be moved toward the system minimum operating resonant frequency F1. Thereafter, the supplying-end microprocessor 11 outputs a PWM signal to the first driver circuit 13/the second driver circuit 14 to drive the supplying-end resonant circuit 15 again. If the comparison result shows that the coil signal amplitude is within the range of the system parameter, the supplying-end microprocessor 11 stores the value of the resonant frequency in the memory thereof for use as system normal operating resonant frequency F2.

Further, when the clock cycle is up, the supplying-end microprocessor 11 outputs a transient PWM signal to the first driver circuit 13/the second driver circuit 14, driving the supplying-end resonant circuit 15 to transmit electromagnetic energy. And then, the supplying-end microprocessor 11 reads in resonant frequency data from the memory thereof, and then outputs a PWM signal to the first driver circuit 13/the second driver circuit 14, driving the supplying-end resonant circuit 15 to transmit the maximum resonant frequency F4, correcting the dropping resonant frequency to the level of the resonant frequency data stored in the memory of the supplying-end microprocessor 11. Thereafter, the supplying-end microprocessor 11 controls the supplying-end resonant circuit 15 to transmit electromagnetic energy at the maximum resonant frequency F4 to deliver power supply to the receiving-end module 2 or to detect feedback data signal from the receiving-end module 2.

When the supplying-end module 1 receives a feedback data signal from the receiving-end module 2, the system enters a power-supplying mode. At this time, the supplying-end microprocessor 11 controls the signal sampling circuit 16 to analyze the ID code of the feedback data signal received from the receiving-end module 2 by the supplying-end coil array 152 of the supplying-end resonant circuit 15 for recognition. If the ID code is not matched, the supplying-end microprocessor 11 determines that no matching receiving-end module 2 is in communication, and then interrupts the power-supplying mode and enters the standby mode. If the ID code is matched, the supplying-end microprocessor 11 reads in the power output data of the system parameter stored in the memory thereof, and judges the power demand of the receiving-end module 2, and then corrects the power output. When it is necessary to lower the power level of the output power, the supplying-end microprocessor 11 raises the signal frequency of the PWM signal, causing the first driver circuit 13/the second driver circuit 14 to lower the power level of the output power of the supplying-end resonant circuit 15. When it is necessary to raise the power level of the output power, the supplying-end microprocessor 11 lowers the signal frequency of the PWM signal, causing the first driver circuit 13/the second driver circuit 14 to raise the power level of the output power of the supplying-end resonant circuit 15. After power output correction, it is necessary to check the power level of the system power output. At this time, the supplying-end microprocessor 11 drives the voltage sensing circuit 17 to detect the power output of the supplying-end resonant circuit 15. If the power output of the supplying-end resonant circuit 15 surpasses the output limit of the first driver circuit 13/the second driver circuit 14, the supplying-end microprocessor 11 immediately changes the coupled configuration of the MOSFET (metal oxide semiconductor field effect transistor) arrays 131;132;133/141;142;143 of the first driver circuit 13/the second driver circuit 14, increasing the number of MOSFETs to be coupled. On the contrary, if the power output of the supplying-end resonant circuit 15 drops below the output limit of the first driver circuit 13/the second driver circuit 14, the supplying-end microprocessor 11 immediately changes the coupled configuration of the MOSFET (metal oxide semiconductor field effect transistor) arrays 131;132; 133/141;142;143 of the first driver circuit 13/the second driver circuit 14, reducing the number of MOSFETs to be coupled. If the power output of the supplying-end resonant circuit 15 is within the range of the output limit of the first driver circuit 13/the second driver circuit 14, the supplying-end microprocessor 11 maintains the coupled configuration of the MOSFET (metal oxide semiconductor field effect transistor) arrays 131;132;133/141;142;143 of the first driver circuit 13/the second driver circuit 14, and then drives the temperature sensor module 18 to detect the working temperature of the first driver circuit 13, the second driver circuit 14 and the supplying-end coil array 152 for determining whether or not the operating temperature is within the predetermined temperature range. If the operating temperature is within the predetermined temperature range, the temperature is normal, and the supplying-end microprocessor 11 repeats another sensing cycle, i.e., controls the signal sampling circuit 16 to analyze the ID code of the feedback data signal received from the receiving-end module 2 by the supplying-end coil array 152 of the supplying-end resonant circuit 15 for recognition. If the ID code is not matched, the supplying-end microprocessor 11 interrupts the power-supplying mode and enters the standby mode.

Further, when the receiving-end module 2 receives an energy in the electromagnetic wave of the transient PWM signal transmitted by the supplying-end module 1, it initials a startup procedure. At this time, the receiving-end microprocessor 21 switches off the synchronous rectifier 23 and the first power switch 242 and the second power switch 244 of the filter circuit 24. When supplying-end module 1 recognized the ID code of the feedback data signal fed back by the receiving-end module 2, it starts to send power supply to the receiving-end module 2. At this time, the receiving-end microprocessor 21 switches on the synchronous rectifier 23, and drives the voltage sensor circuit 26 to detect the voltage at the high-frequency filter capacitor 241 of the filter circuit 24. If the voltage at the high-frequency filter capacitor 241 is below the predetermined level, the receiving-end microprocessor 21 immediately outputs an encoded signal to the signal modulation circuit 27 for transmission by the receiving-end coil array 221 to the supplying-end module 1, requesting the supplying-end module 1 to increase the power level of its output power. If the voltage at the high-frequency filter capacitor 241 surpasses the predetermined level, the receiving-end microprocessor 21 immediately outputs an encoded signal to the signal modulation circuit 27 for transmission by the receiving-end coil array 221 to the supplying-end module 1, requesting the supplying-end module 1 to lower the power level of its output power. After transmission of an encoded signal to request the supplying-end module 1 to adjust the power level of its output power, the receiving-end microprocessor 21 drives the voltage sensor circuit 26 to detect whether the voltage of the high-frequency filter capacitor 241 to be within the limited range or not. If the voltage is within the limited range, the receiving-end microprocessor 21 immediately switches on the first power switch 242. If the voltage is out of the limited range, the receiving-end microprocessor 21 determines whether or not the constant voltage of the high-frequency filter capacitor 241 is excessively high. If the constant voltage of the high-frequency filter capacitor 241 is not excessively high, the receiving-end microprocessor 21 drives the voltage sensor circuit 26 to detect the voltage status of the high-frequency filter capacitor 241. If overvoltage, it means an error. At this time, the receiving-end microprocessor 21 switches off the synchronous rectifier 23 and the first power switch 242 and the second power switch 244 of the filter circuit 24, and then outputs an encoded power-interruption signal to the signal modulation circuit 27 for transmission by the receiving-end coil array 221 to the supplying-end module 1, requesting the supplying-end module 1 to interrupt the power-supplying operation.

Further, when the receiving-end microprocessor 21 switches on the first power switch 242, it immediately drives the voltage sensor circuit 26 to detect the voltage of the low-frequency filter capacitor 243. If the voltage of the low-frequency filter capacitor 243 is below the predetermined range, the receiving-end microprocessor 21 immediately outputs a corresponding encoded signal to the signal modulation circuit 27 for transmission by the receiving-end coil array 221 to the supplying-end module 1, requesting the supplying-end module 1 to raise the power level of its output power. If the voltage of the low-frequency filter capacitor 243 surpasses the predetermined range, the receiving-end microprocessor 21 immediately outputs a corresponding encoded signal to the signal modulation circuit 27 for transmission by the receiving-end coil array 221 to the supplying-end module 1, requesting the supplying-end module 1 to lower the power level of its output power. Thereafter, the receiving-end microprocessor 21 drives the voltage sensor circuit 26 to detect the voltage of the low-frequency filter capacitor 243 so that the receiving-end microprocessor 21 can determine whether or not the constant voltage of the low-frequency filter capacitor 243 is excessively high. If the constant voltage of the low-frequency filter capacitor 243 is excessively high, is means an error. At this time, the receiving-end microprocessor 21 switches off the synchronous rectifier 23 and the first power switch 242 and the second power switch 244 of the filter circuit 24. When the voltage of the low-frequency filter capacitor 243 resumes normal, the receiving-end microprocessor 21 switches on the second power switch 244 of the filter circuit 24, enabling the second power switch 244 to output DC power supply to the receiving-end output terminal set 25. At the same time, the receiving-end microprocessor 21 drives the temperature sensor module 28 to detect the operating temperature of the filter circuit 24 and the receiving-end coil array 221. If the operating temperature surpasses the predetermined range, it means an error. At this time, the receiving-end microprocessor 21 switches off the synchronous rectifier 23 and the first power switch 242 and the second power switch 244 of the filter circuit 24 again. When the operating temperature becomes normal, the power supplying operation is continued, and the receiving-end module 2 is ready for a next voltage detection cycle, enabling the receiving-end microprocessor 21 to switch on the synchronous rectifier 23 again.

As stated above, the first driver circuit 13/the second driver circuit 14 of the supplying-end module 1 utilizes multiple parallel MOSFET (metal oxide semiconductor field effect transistor) arrays 131;132;133/141;142;143 to distribute electric current. The effect of this parallel connection of equivalent resistances effectively lowers the impedance value and heat releasing status of other electronic components.

Further, using two MOSFET arrays to drive a resonant circuit can be done through a full-bridge operation or a half-bridge operation. In the full-bridge operation, signal reverse driving of the two MOSFET arrays doubles the power voltage for driving the resonant circuit. In the half-bridge operation, one MOSFET array is used for driving the resonant circuit and the other MOSFET array is grounded. However, when a MOSFET component is electrically connected, there is a RDS-ON (Drain-source On) conducting resistance, and the MOSFET component may burn out upon a large current. To avoid this problem, the invention utilizes the temperature sensor module 18 to detect any temperature abnormality. By means of the temperature sensor module 18, the supplying-end microprocessor 11 monitors the operating temperature of every of the MOSFET (metal oxide semiconductor field effect transistor) arrays 131;132;133;141;142;143, and can immediately switch off any MOSFET array in trouble. Further, the supplying-end microprocessor 11 can change the coupled configuration of the MOSFET (metal oxide semiconductor field effect transistor) arrays 131;132;133/141;142;143 of the first driver circuit 13/the second driver circuit 14 subject to actual power requirement, thereby lowering the impedance and temperature during a high power output, or reducing the power loss of switching components during a lower power output.

Figure 4:
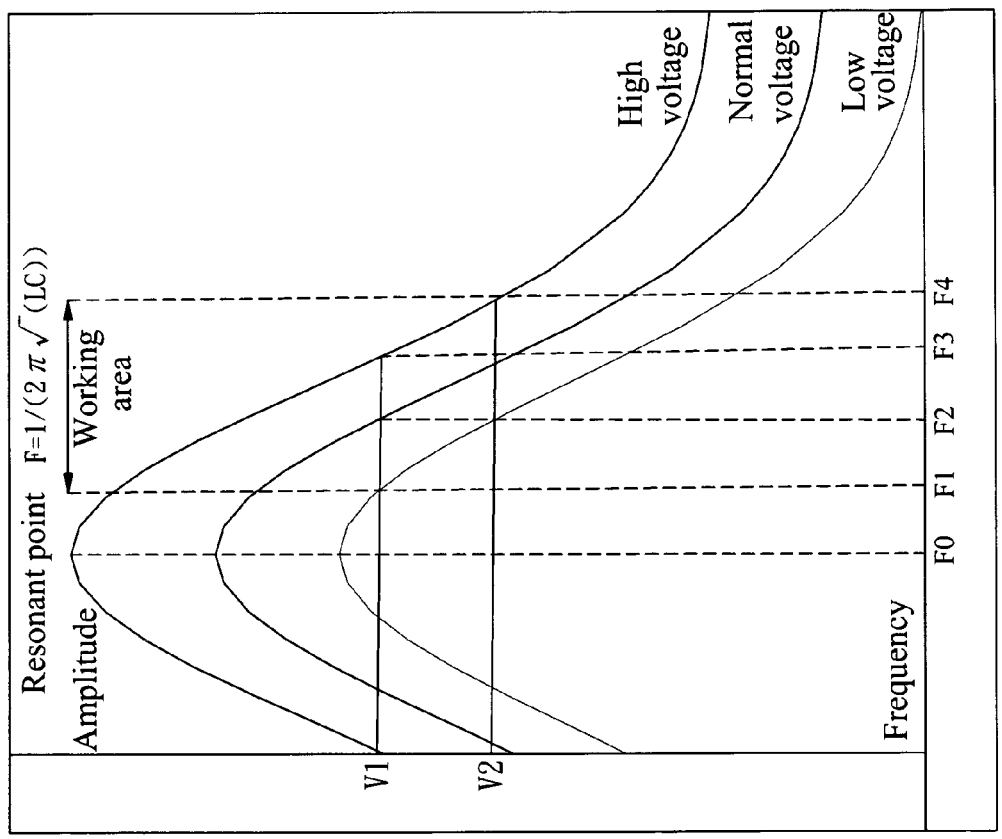
FIG. 4 is a resonant frequency-amplitude diagram obtained from the mobile wireless charger system in accordance with the present invention.

Referring to FIG. 4, the resonant frequency of the supplying-end resonant circuit 15 is controlled subject to an automatic frequency-modulated scanning operation. The frequency at each resonant point is respectively defined as follows:

F0: The maximum resonant frequency of the supplying-end coil array 152 and the capacitor array 151 that varies with the inductance of the capacitor array 151 and change of the surroundings. If the supplying-end module 1 operates at this point, the amplitude will be great and may cause system overload. The software architecture of the supplying-end microprocessor 11 avoids output of operating frequency at this resonant frequency.

F1: The system predetermined minimum resonant frequency of the supplying-end coil array 152 and the capacitor array 151. As the resonant frequency varies with the inductance of the capacitor array 151 and change of the surroundings, it cannot be defined in advance. Thus, this resonant frequency is defined by the system predetermined maximum working amplitude V1.

F2: The system normal operating resonant frequency defined by the system predetermined maximum working amplitude V2.

F3: The system maximum operating resonant frequency.

F4: The maximum resonant frequency outputted by the supplying-end microprocessor 11.

As the system operation needs to define the working frequency range so as to avoid insufficient output power or overload, continuous frequency-modulated scanning must be performed to correct and control the output power. The scanning performance is to output the maximum resonant frequency F4 at first and then to lower the output resonant frequency. At this time, the coil signal amplitude will increase gradually, and will pass through V2 and V1 in proper order. When reached V1, the supplying-end microprocessor 11 stops the power output and stores the corresponding resonance frequency data in the memory thereof for further use in the operation, and then uses the resonant frequency of V2 to sense the receiving-end module 2. In system operation, F1, F2, F3 and F4 are not constant, and will be continuously corrected to adjust and control the output power subject to the requirement of the receiving-end module 2.

The frequency-modulated system of the present invention fits different power sources, such as high voltage power source (city power supply, AC-to-DC transformer), normal voltage power source (computer USB output), or low voltage power source (battery voltage). As shown in FIG. 4, in one same coil and capacitor combination, different voltages produce different resonance curves. When at one same frequency under high output power V1 or low output power V2, the higher the driving voltage is, the greater the output amplitude will be. When high output power V1 is required and a high voltage power source is adopted, the system automatically adjusts the coil signal amplitude toward the system maximum operating resonant frequency F3 to output the target power; when a normal voltage power source is inputted, the system automatically adjusts the coil signal amplitude toward the system normal operating resonant frequency F2 to output the target power; when a low voltage power source is inputted, the system automatically adjusts the coil signal amplitude toward the system predetermined minimum resonant frequency F1 to output the target power. Further, when low output power V2 is required and a high voltage power source is adopted, the system automatically adjusts the coil signal amplitude toward the maximum resonant frequency F4 to output the target power; when a normal voltage power source is inputted, the system automatically adjusts the coil signal amplitude toward the system maximum operating resonant frequency F3 to output the target power; when a low voltage power source is inputted, the system automatically adjusts the coil signal amplitude toward the system normal operating resonant frequency F2 to output the target power. Thus, by means of changing the working frequency, system target power value is automatically adjusted. In actual operation, the amount of variation is quite small. Subject to software performance, the system automatically sets the output to be close to the target value, so that when the system adopts a low voltage power source (such as battery) for input, the output voltage will be changed subject to the capacity of the battery. By means of the aforesaid method to change the working frequency, non-fixed power voltage can be used without boosting the voltage level in advance.

It is to be understood that the above described embodiment is simply an exemplar of the invention but not intended as limitations. Subject to the performance of the frequency-modulated output method in the system from zero output to startup of output, i.e., from frequency F4 to frequency F2, the invention prevents many problems. If the frequency-modulated output method is not employed to the system, the system will wake up from the standby mode to output the resonant frequency F2 directly. Subject to the characteristics of the resonant circuit, an excessively high oscillation will be generated, and then the oscillation will be smoothened to a stable status. However, repeatedly entering standby mode, starting up scanning signal and then entering standby mode again will also cause generation of an excessively high oscillation at the beginning stage, causing surge current and EMI (electromagnetic interference) problems. The invention uses an automatic frequency modulation technique to amplify the coil signal amplitude from a minor status to a stabilized status, avoiding signal surge and controlling optimal power output to save power.

A prototype of mobile wireless charger system has been constructed with the features of FIGS. 1-4. The mobile wireless charger system functions smoothly to provide all of the features disclosed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. Mobile wireless charger system comprising a supplying-end module and a receiving-end module adapted for receiving electrical power from said supplying-end module wirelessly for charging an external electronic device being connected thereto, said supplying-end module comprising a supplying-end microprocessor having set therein an operation and control software and a memory, a power supply circuit electrically coupled with said supplying-end microprocessor and adapted for receiving external power supply, a first driver circuit electrically coupled to said supplying-end microprocessor, said first driver circuit comprising a plurality of MOSFET (metal oxide semiconductor field effect transistor) arrays connected in parallel, a second driver circuit electrically coupled to said supplying-end microprocessor, said second driver circuit comprising a plurality of MOSFET (metal oxide semiconductor field effect transistor) arrays connected in parallel, a supplying-end resonant circuit, said supplying-end resonant circuit comprising capacitor array electrically connected to said first driver circuit and a supplying-end coil array electrically connected to said second driver circuit to obtain the necessary working energy, a signal sampling circuit electrically coupled with said supplying-end coil array, a data-analyzing circuit electrically coupled between said supplying-end microprocessor and said signal sampling circuit and a voltage sensing circuit electrically coupled between said supplying-end microprocessor and said signal sampling circuit in a parallel manner relative to said data-analyzing circuit, wherein said power supply circuit of said supplying-end module comprises:

an external power supply unit for input of different voltages;
a power receiver for receiving external power supply;
a storage battery;
a charge control circuit;
a collector circuit electrically coupled with said power receiver and adapted for collecting electric energy from said power receiver for storing in said storage battery subject to the control of said charge control circuit;
a voltage-sensing circuit electrically coupled with said supplying-end microprocessor and adapted for sensing the voltage at said external power supply unit and storage battery;
a first power switch circuit electrically coupled to said supplying-end microprocessor and adapted for receiving power supply from said external power supply unit and transmitting received power supply to said charge control circuit;
a second power switch circuit electrically coupled to said supplying-end microprocessor in a parallel manner relative to said first power switch and adapted for receiving power supply from said external power supply unit and transmitting received power supply to said supplying-end module; and
a third power switch circuit electrically coupled to said supplying-end microprocessor in a parallel manner relative to said first power switch and adapted for receiving power supply from said storage battery and transmitting received power supply to said supplying-end module.

2. The mobile wireless charger system as claimed in claim 1, wherein said external power supply unit is configured for the connection of an USB connector, AC-to-DC transformer or city power plug for input of power supply.

3. The mobile wireless charger system as claimed in claim 1, wherein said power receiver is configured to receive a low power from an external power source of solar battery, kinetic energy cell or thermal energy cell for storing DC power supply in said storage battery.

4. The mobile wireless charger system as claimed in claim 1, wherein when a high power is inputted into said external power supply unit, said supplying-end module switches on said first power switch circuit and said second power switch circuit and switches off said third power switch circuit, enabling inputted power to be directly used for transmitting to said receiving-end module and also to be charged into said storage battery.

5. The mobile wireless charger system as claimed in claim 1, wherein when a low power is inputted into said external power supply unit, said supplying-end module switches on said second power switch circuit and switches off said first power switch circuit and said third power switch circuit, enabling inputted power to be used for transmitting to said receiving-end module.

6. The mobile wireless charger system as claimed in claim 1, wherein when said external power supply unit receives no power input, said supplying-end module switches on said third power switch circuit and switches off said first power switch circuit and said second power switch circuit, enabling the storage power of said storage battery to be used for transmitting to said receiving-end module.

7. The mobile wireless charger system as claimed in claim 1, wherein when said voltage-sensing circuit senses the storage power of said storage battery to become below a predetermined low value, said supplying-end module switches off said first power switch circuit, said second power switch circuit and said third power switch circuit.

8. The mobile wireless charger system as claimed in claim 1, wherein when starting the mobile wireless charger system is started up, said supplying-end microprocessor of said supplying-end module runs the built-in software to read in the default parameters from the memory thereof and then to scan coil resonant points, and at this time, said supplying-end microprocessor scans, in a frequency-modulated manner, the maximum resonant frequencies of said supplying-end coil array and capacitor array of said supplying-end resonant circuit, system predetermined minimum resonant frequency, system normal operating resonant frequency, system maximum operating resonant frequency and the maximum resonant frequency for output by said supplying-end microprocessor, and then stores scanned resonant frequency data in the memory thereof.

9. The mobile wireless charger system as claimed in claim 1, wherein during system operation, said supplying-end microprocessor outputs a transient PWM signal to said first driver circuit/said second driver circuit, driving said supplying-end resonant circuit to transmit electromagnetic energy for sending power supply.

10. The mobile wireless charger system as claimed in claim 1, wherein said signal sampling circuit is controllable by said supplying-end microprocessor to scan feedback data signal from said receiving-end module via said supplying-end coil array.

11. The mobile wireless charger system as claimed in claim 1, wherein said supplying-end module further comprises a temperature sensor module electrically coupled with said supplying-end microprocessor and adapted for sensing the working temperature of said first driver circuit, said second driver circuit and said supplying-end coil array.

12. The mobile wireless charger system as claimed in claim 1, wherein said supplying-end microprocessor controls said voltage sensing circuit to detect the value of the output power of said supplying-end resonant circuit and adjusts the coupled configuration of the MOSFET arrays of said first driver circuit/said second driver circuit.

\* \* \* \* \*